Dec. 23, 1969 A. L. FASSAUER 3,485,635
PROCESS FOR FORMING A WATER AND AIR IMPERMEABLE FORAGE
COVER AND THEREAFTER ENSILING
Filed Sept. 22, 1965 2 Sheets-Sheet 1
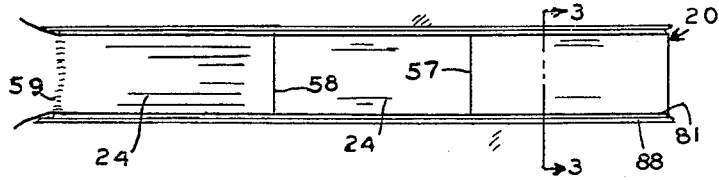
FIG. 1
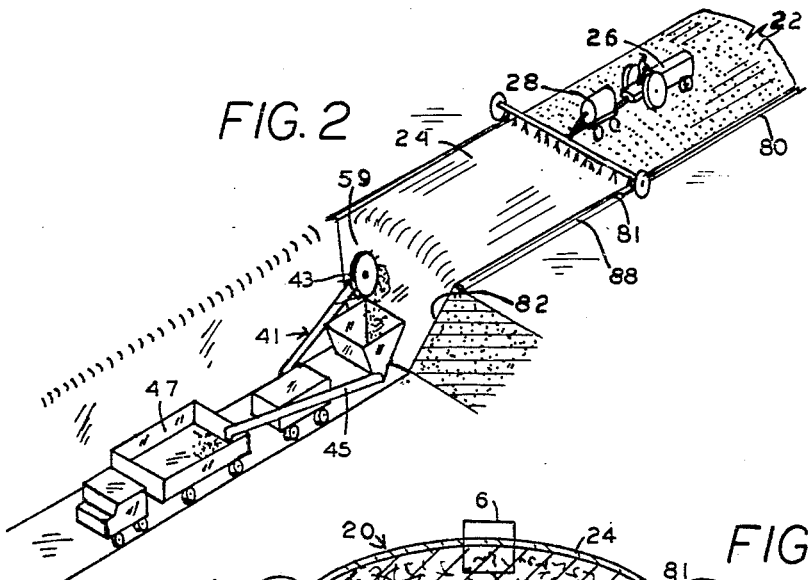
FIG. 2
FIG. 3
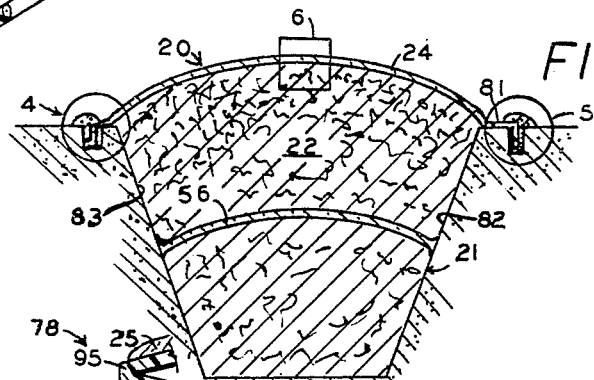
FIG. 4
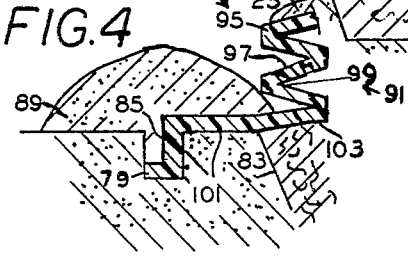
FIG. 5
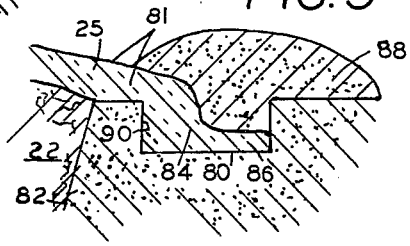
FIG. 6
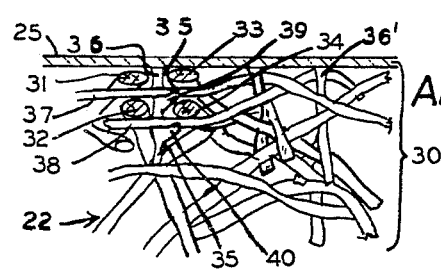
ARTHUR L. FASSAUER
INVENTOR.
BY
Ely Silverman
ATTORNEY Dec. 23, 1969              A. L. FASSAUER              3,485,635
PROCESS FOR FORMING A WATER AND AIR IMPERMEABLE FORAGE
COVER AND THEREAFTER ENSILING
Filed Sept. 22, 1965              2 Sheets-Sheet 2

ARTHUR L. FASSAUER
                  INVENTOR.

BY

*Ely Silverman*
     ATTORNEY

United States Patent Office 3,485,635
Patented Dec. 23, 1969

3,485,635
PROCESS FOR FORMING A WATER AND AIR IMPERMEABLE FORAGE COVER AND THEREAFTER ENSILING
Arthur L. Fassauer, 420 Foster Lane,
Canyon, Tex. 79015
Filed Sept. 22, 1965, Ser. No. 489,308
Int. Cl. A01f 25/16; E04h 7/22
U.S. Cl. 99—8                      10 Claims

ABSTRACT OF THE DISCLOSURE

Process for storing of forage crops, ensiling and feeding animals therewith, comprising the steps of placing in a silo forage producing silage comprising intermeshed forage components with orifices outlined therebetween, applying molten material to form a water-insoluble and water-tight continuous exterior cover sheet impermeable to air on top thereof while also driving the material through the orifices between the intermeshed components thus forming vertically elongated masses thereof with lateral extensions locking same with components adjacent thereto, said material being edible by ruminants and of adequate frangibility to be readily broken to bite size, thereafter ensiling said forage and removing portions of the resultant silage together with portions of said cover from said silo and mixing said portions of silage and said portions of said cover and feeding said admixture to cattle.

---

This invention relates to the storage of forage crops for animal feed and, more particularly to new and useful silo constructions.

While the storage of silage for animal feeding has a long history, there is, usually, according to common practice, very large waste of volume of such material, of nutrient value of such material and of the commercial value of such silage between the time of the beginning and end of the usual silage storage period.

Silage is conventionally stored in above ground silos and in trench silos. Generally, when fresh plant material is placed within a silo or in a storage area the living cells thereof continue to respire, converting oxygen into carbon dioxide or carbonic acid. Thereafter acid forming bacteria multiply enormously and attack the sugars present in the plant material breaking them down into simple organic acids. The activity of such acid forming bacteria requires exclusion of air. The production of these acids such as lactic and acetic is the most important change in the process of converting fresh forage crops to silage, the acids preventing spoilage of the silage. By this invention, whereby oxygen is effectively prevented from gaining entrance into the compacted fermented material, the material may be stored for an extended period of time, with practically no decrease in quality.

When storing usual forage producing silage, e.g. corn silage which usually contains 50 to 75% moisture, a quantity of air is introduced into the silage during the procedure of filling the silo or trench chamber. The oxygen in the chamber reacts chemically, until consumed, with the stored material.

After a mass of silage has been compacted in the field or in a silo, the silage has a tendency to breathe air into and out of the silage as daily variations in temperature and pressure result in creation of a pressure differential; this differential may become sufficiently great to break the seal of the container if one is put on the mass of silage.

Supplying fresh oxygen to the silage air will enhance undesirable mold growths and produce consequent deterioration of the silage and development of gas pressure.

Conventionally, trench silos are not covered to exclude air. There is conventionally a substantial loss, usually 20 to 30% thereof, of nutrient value and dry matter through oxidation, fermentation and evaporation in conventional silo storage for usual 9 to 12 months storage periods therefor. With all good feed as cut, in a conventional trench silo of 14 ft. height, 35 ft. width, and 300 to 1,000 ft. length for example, as initially stored, there is, over a 9 month period, a usual amount of shrinkage of 12%, a thin layer of rotten feed to about 3%, and the good feed settled is only about 85% of that added. However, oxidation and overheating provide a carmelized area so that, at the end of the silage period, there is only approximately 42% of the original weight unchanged. Loss of 35 to 50% of the dry matter as initially stored are common and loss of water through evaporation reduces the efficiency of conversion of the nutrient value of the silage by the ruminate consumer of the silage.

Trench silo pits or trenches are conventional each approximately 30 feet wide by perhaps 1,000 to 4,000 feet long. The handling of sheets of such size as covers for covering an opening of such size for such silos is inconvenient, expensive, and can be dangerous and the disposal, likewise, is a problem.

By this invention the interior of the silo is effectively sealed at its top by a flexible, impermeable and edible cover. The cover arrangement is such that it excludes air, preserves nutrient values of the feed, can be installed on existing trench silo without the exercise of specialized skill economically and rapidly, and provides no problem for removal thereof.

One object of this invention is to decrease the cost of and losses in storage of silage.

Another object of this invention is to provide an improved trench silo;

Yet another object of this invention is to provide an improved process of storing silage;

A further object of this invention is the provision of an improved method of storage and feeding of silage for ruminates;

Yet a further object of this invention is an improved feed composition for ruminates;

The foregoing and other objects and advantages of my invention will become apparent to those skilled in the art on study of the following disclosure of which disclosure the accompanying drawings form a part and wherein like numerals refer to like parts throughout and wherein:

FIGURE 1 is a top view of a sectionalized trench silo according to my invention;

FIGURE 2 is a perspective view of a trench silo according to my invention, this view being a composite view showing the trench silo cover in the process of being made and also the apparatus for the unloading of the silo acting thereon and delivering the comminuted cover, admixed with silage, to transportation means for transport of the admixture to location for the feeding of said admixture to cattle.

FIGURE 3 is a sectional view of the trench silo shown in FIGURE 1 along the section indicated by line 3—3 in FIGURE 1.

FIGURE 4 is an enlarged view, shown diagrammatically, of one embodiment of edge attachment such as shown in zone 4 of FIGURE 3.

FIGURE 5 is an enlarged view, shown in diagrammatically representation, of another embodiment of edge attachment of the seal cover as shown in the zone 5 of FIGURE 3.

FIGURE 6 is a diagrammatic cross sectional view of a portion of the seal cover and adjacent silage in zone 6 of FIGURE 3 according to this invention.

FIGURES 7, 8 and 10 are longitudinal sectional views along the diametrical longitudinal plane shown as 7—7 on FIGURE 9.

Figure 7:
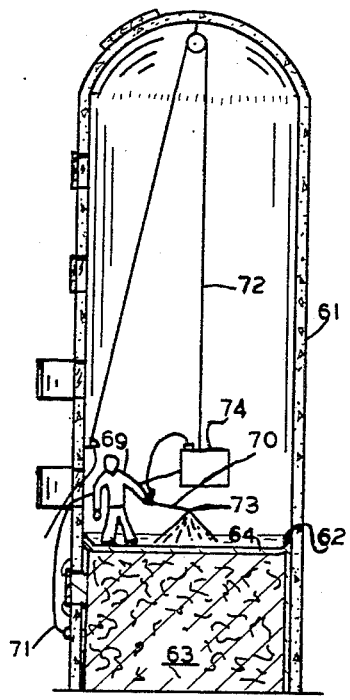
FIGURE 7 is a diagrammatic cross sectional view of a silo treated and operated according to another embodiment of this invention.

One embodiment of a type of silo according to this invention is shown in FIGURES 1-6, where item 20 is a U-shaped trench silo, item 22 is a silage therein, and item 24 is a cover therefor. Trench silo 20 comprises a trench 21 (14 feet deep, 35 feet wide and 300 feet long) the silage therein and the cover therefor. At a time of maximum nutritive value, the forage producing silage is cut and the silo trench 21 is filled therewith, such as, for the preferred embodiment herein described, corn silage of 65 to 80% moisture content. The mass of silage is then compacted, as by driving a tractor up and down the length thereof. This compaction brings the silage mass to a compressive strength of above 20 p.s.i. and about 30 p.s.i. and drives most of the air out from between the interstices of the intermeshed silage components. Thereupon the silage is covered by a spray, in the preferred embodiment, of a microcrystalline wax, a material that, when solidified is impermeable to air and water. The wax may be drawn from a heated tank at 160°–180° F. and sprayed on the silage, e.g. from a heated tank 28 drawn by a tractor 26 as shown in FIGURE 1. The tractor 26 helps to compact the silage to be covered by the cover. The manner of spraying here is such as to form an impermeable cover of about ⅛″ thickness which completely covers over the entire top of the trench in which the silage is stored.

The cover 24 is made of a sprayed microcrystalline wax which wax is, water-insoluble, non-toxic for animals and has a melting point of about 150° F.

The cover 24 comprises a continuous exterior cover sheet portion 25 and an interior cover holding structure 30. An upper portion of the silage mass at zone 6 of FIGURE 3 is shown, enlarged and diagrammatically, in FIGURE 6. There, several longitudinally extending portions 31–34 of silage are shown spaced apart by laterally extending intermeshed silage components 37 and 38, with an orifice 35 outlined therebetween. A "pipe" or vertically elongated mass of wax 36 connected to cover layer 25 extends through 35 and is provided with lateral extensions 39, 40 that form reentrant angles and lock with silage components adjacent thereto.

The cover 24 is water-insoluble and completely impermeable to water and air and prevents "breathing" of the silage, oxidation, and evaporation and loss in the nutritive values thereof.

The spraying according to this invention is performed at a sufficient pressure to form a complete exterior layer 25, of about ⅛″ thickness in the preferred embodiment and the pressure is sufficient to drive the molten wax through orifices between interlacing portions of the silage as 31–34 to form extensions or pipes as 36, 36′. The reentrant angles on the bottom of the upper interlocked components of the silage at "pipe" extensions as 39 and 40 serves to hold down the cover layer 25 at a multiplicity of points, each only lightly holding the cover and, thereby serving to hold the cover down as well as prevent the shifting thereof.

These pipes or trees 36 and 36′ serve to lock the adjacent interlaced silage components to each other as well as to the layer 25, thereby the strength of the layer 25 and structure 30 and the interlaced and compressed silage components assist and complement each other. Microcrystalline wax has a substantial strength e.g. 200–400 p.s.i. tensile strength at 73° F. (ASTM D–1320) and flexibility (Industrial Waxes, vol. 1, Natural and Synthetic Waxes, H. Bennett, Chemical Publishing Co., New York, 1963, p. 109, Table 2:15, "Properties of Commercial Microcrystalline Waxes by Special Testing Methods").

This "piping" and "treeing" of the sprayed plastic or wax to a sufficiently substantial depth (i.e. ½ inch) below the top of the silage improves the attachment of the cover to the silage mass. The plastic or waxy layer is continued onto the zones 5 and 4 whereat, as below described, a water-tight and air-tight seal between the cover and the structure surrounding the stored silage is effected.

The wax is sprayed at a sufficiently high temperature to avoid restrictions due to low temperatures and is sufficiently free from various preservatives to avoid objectionable characteristics as a feed while still being sufficiently stable and thick to last for a period of about eight months to be effective as a storage cover for this type of material. The thickness of the sprayed layer will be between ¹⁄₂₅ and ⅛ inch.

The composition of the covering layer is such as to be nontoxic to animals. The wax for this purpose is free from surface agents such as sulfonates etc. that may be harmful to animals' digestive systems and processes. Crazing is not a critical characteristic; there will be sufficient pliability in the cover by addition if needed, to the composition of oil or an increased content of cyclic and branched paraffins to prevent undue stiffness and cracking that might destroy the imperforate characteristic of the cover.

On completion of the storage period of the silage the cover does not have to be separately removed but is mixed up with the foodstuff (silage) itself for delivery therewith to the animals being fed.

According to this process and use of nontoxic, edible (to cattle) coating there is no cover disposal problem. This is a very substantial labor-saving advance.

The silage, after its period of storage is unloaded from the trench by conventional silo unloaders 41 (such as Ensiloader® of Oswalt Industries, Garden City, Kans.). The unloaders comprise a comminuting or digging means 43 that enters into and chews into the cover 24 and the mass of silage thereunder, comminutes and admixes them and transports, as by a conveyor 45, the admixture to a carrier such as a conventional truck, 47; the carrier, 47, transports the mixture of silage and comminuted cover material to a cattle feeding location or trough whereat cattle consume the silage-cover admixture, which admixture may, prior to feeding to cattle be admixed with grain or other animal nutrient.

As waxes are digestable by ruminants in compositions up to 10% by weight in animal feeds the cover adds to the total digestable nutrient content of the silage.

A ⅛″ thick cover is 0.07% of the volume of a 14 ft. high trench silo, a ¹⁄₁₆″ thick cover is 0.035%. Accordingly the particular preferred above described embodiments of the invention provides silage feed composition with from 0.035% to about 0.07% by volume of comminuted cover material as above described. The scope of the invention would be applied to lower and higher silos e.g. 8 to 20 feet, and the corresponding percentages of comminuted wax produced by breaking up of the wax cover would accordinly vary within a range of 0.02 to 0.10% by volume or weight. The use of microcrystalline wax is preferred because of its flexibility, high melting point (145–195° F., 150° F. preferred) adequate plasticity and strength (tensile strength in excess of 80 p.s.i.) yet adequate frangibility to be readily comminuted to sizes that will cause no difficulty on ingestion by a ruminate (tensile strength of about 500 p.s.i. is the maximum readily broken to "bite" size). Exemplary of the wax to be used in the preferred embodiment are Aristowax® 143/150 (of Petroleum Products and Producing Co.) and Aristowax 143/50 and 143/50 NC, the characteristics of which are given in Table I hereinbelow.

As the specific gravity of the waxes used is about the same as specific gravity of the silage composition, .02 to 0.10% by volume is the same as .02 to 0.10% by weight. Also included within the scope of this invention for use as cover are blends of low molecular weight polyethylene (mol. wt. of about 2,000, melting point of about 216° F.) added to about 20% by weight of a mixture thereof with paraffin wax (M.P. of about 150° F.). The hereinabove described microcrystalline waxes and blend with paraffin waxes are flexible hydrocarbon waxes.

While the preferred embodiments have adequate resistance to cold (low plastic point) flexibility as needed can be provided to microcrystalline waxes by adding oil thereto.

By this arrangement the moisture and dry matter content of the silage is preserved with less than 6% loss; this is of particular value in preserving the efficiency of conversion of such feed to meat by the cattle consuming the silage (or ensilage) stored (or ensiled) according to the above described process and apparatus.

The silo 20 may be provided with an intermediate cover 56 similar to cover 24 whereby, on opening of the silo only a part thereof is exposed to the air. The cover 56 is firmly sealed to the sides of the silo. It may be applied after roughly ½ of the silage to be loaded in the silo is delivered thereto as where, in long trench silos— of up to 4,000 feet in length—there may be delays in filling the entire silo in one operation. Similarly, the silo may be provided with longitudinally spaced apart transverse covers 57 and 58 corresponding to the end cover 59 at the terminal end of the trench silo 20.

TABLE I.—CHARACTERISTICS OF MICROCRYSTALLINE ARISTOWAXES

| Type of Wax | 143/150 | 143/150 NC |
|---|---|---|
| American Melting Point (ASTM D-87+3° F.) | 146 | 148 |
| Congealing Point, ASTM D-938, ° F | 143 | 145 |
| Oil Content, ASTM D-721, percent by weight | 0.15 | 0.04 |
| Saybolt Color, ASTM D-156 | +28 | +28 |
| Kinematic Viscosity, ASTM D-445, centistokes at 210° F | 5.4 | 4.8 |
| Saybolt Universal Viscosity, ASTM D-466: | | |
| SSU at 150° F | 63.2 | 56.3 |
| SSU at 175° F | 52.2 | 48.4 |
| SSU at 210° F | 44.0 | 42.0 |
| SSU at 250° F | 39.1 | 37.9 |
| Needle Penetration, ASTM D-1321: | | |
| Mm.×10 at 77° F | 12 | 10 |
| Mm.×10 at 90° F | 15 | 14 |
| Mm.×10 at 100° F | 29 | 25 |
| Mm.×10 at 110° F | 50 | 55 |
| Brinell Hardness Number, UTM 197: | | |
| Kg./cm.² at 60° F | 75 | 95 |
| Kg./cm.² at 100° F | 14 | 30 |
| Cylinder Penetration, UMT 203, in./min.×10⁴ at 100° F | 10 | 0.5 |
| Blocking Temperature, ASTM D-1465, ° F | 116 | 119 |
| Modulus of Rupture, ASTM 1958 App VI: | | |
| P.s.i. at 32° F | 440 | 440 |
| P.s.i. at 73° F | 350 | 400 |
| Tensile Strength, ASTM D-1320, p.s.i. at 73° F | 340 | 360 |
| Sealing Strength, ASTM 1958: | | |
| App V, g./in | 5 | 5 |
| With 4% polyethylene, g./in | 5 | 19 |
| Specific Gravity, 212° F./39.2° F | 0.7660 | 0.7627 |
| Refractive Index at 212° F | 1.4275 | 1.4255 |
| COC Flash Point, ASTM D-92, ° F | 490 | 480 |

The cover 24 is, as above shown in the figures, slightly (e.g. ½ to 1½ inches in height per foot of width) higher in the center than laterally to allow run-off of water while avoiding catching the wind. It is sufficiently flexible and tough and firmly attached to and supported by the silage therebelow to withstand the usual effect of wind and weather. It is also entirely waterproof. The air-tight attachment of the cover portion to the side of the silo is accomplished by first creating a small cover sealing trench 80 at one side of and parallel to one silo wall 82. The trench 80 is ½" wide and 4 inches deep and about 8 inches from the silo wall 82 and substantially uniform in cross section throughout its length. The cover portion 25 is continued laterally of wall 82 by portion 81 into the trench. The cover is provided with a vertically extending portion 84' attached to portion 81 and a lower laterally lower extending portion 86 attached to portion 84. A mound of compacted dirt, 88, about 8 inches high and 16 inches wide in cooperation with the central edge 90 of trench 80 holds the one edge of cover 24 from lateral motion; the mound of dirt above portion 86 holds the edge from vertical motion; portions 81, 84 and 86 and mound 88 serve to form an airtight seal at the lateral edge of sheet 25 with as much flexibility as needed. This structure is preferred. Portions of 84, 82 and 86 are each ⅛ inch thick.

The seal on the opposite side of cover is the same as above discussed for zone 5 of FIGURE 3. It is additionally within the scope of this invention that a different type of seal may be used; such a seal is shown in FIGURE 4. This seal would, like that of FIGURE 5, be operatievly connected at a position as shown as zone 5 of FIGURE 3; this seal comprises a trench 79 which is ½" wide and 4" deep and 8" from the adjacent side wall 83 and a seal element 78. The seal element 78 is a 36" wide strip of flexible polyethylene of very low molecular weight i.e. about 2,000 e.g. an A-C® polyethylene of Allied Chemical Corp., grade 6 or 6A, M.P.=219-226° F. (ASTM E-28-51T) insoluble in water and compatible with waxes (cf. p. 111 of Bennett, vol. II, Industrial Waxes). The seal element 78 has an accordion fold portion 91, a middle portion 101 and an L-shaped fold 85. Fold 85 is located in trench 79 and held there by a mound of earth 89. Element 101 is attached to element 85 and 91. The accordion element 91 has an upper fold 95, an intermediate fold 99, and a lower portion 103. The cover layer 25 is applied to the top portion of the uppermost accordion fold. A one way flapper valve 97 may be a part of the intermediate fold 99 while the lowermost portion 103 provides for attachment to the middle portion 101. This seal is laid down in place prior to spraying the cover. The spray adheres to the portion 95 and valve 97 allows escape of any excess gas that might otherwise raise the cover.

According to another embodiment of this invention an above ground silo 61 is loaded with forage producing silage, 63, the silage is compacted and an operator 69 applies a cover 64 thereto. This cover extends completely from one side of the silo to the other and is firmly attached thereto by an upwardly extending lip 62; it forms a complete air tight seal between the mass of silage 63 below the cover and the air thereabove. The composition and structure of the cover 64 is the same as above described for cover 24. The operator 69 is provided with a hand controlled spray 70. The spray is provided with a 220 volt line 71 for heating the wax in a tank 74 feeding the spray and a 110 volt line 72 to actuate the spray motor feeding the molten material to a spray head 73 for application to the silage 63. The silage 65 added to the silo 61 after the completion of cover 64 is compacted and a complete cover 66 similar to 64 applied thereto.

Subsequently, after addition of a further mass of silage 67 on top of cover 66 and compaction thereof a cover 68 is added to the silage mass 67.

There is usually 10 to 20 feet between the levels of covers 64, 66 and 68.

Removal of the silage mass 67, 65, and 63 is accomplished by a conventional auger 75 suspended from the top of the silo. It breaks up the cover as 68 and admixes it with the silage therebelow. It is provided with an air pump 77 that drives the material lifted by the auger to a carrier as 47 for distribution to a location as 49 whereat cattle are fed with the resulting mixture of comminuted sheet material and ensilage.

Figure 8:
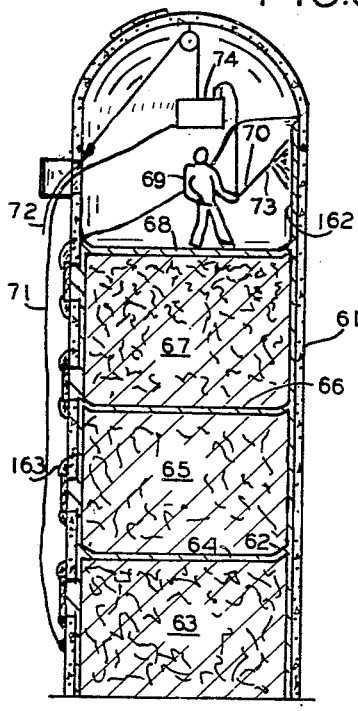
FIGURE 8 is a later stage in the operation of the process illustrated in FIGURE 7.
Figure 9:
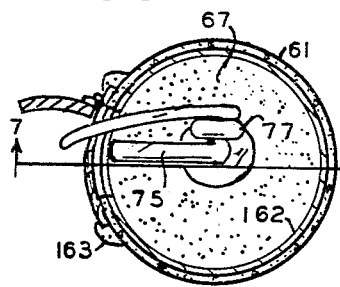
FIGURE 9 is a section view along the plane 9—9 of FIGURE 10 showing a top view of the unloading operation shown in FIGURE 10.
Figure 10:
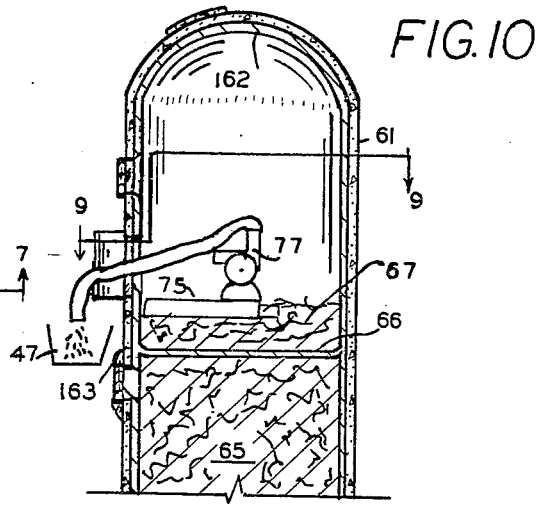
FIGURE 10 is a stage, later than that shown in FIGURE 8, of the operation outlined in FIGURES 7 and 8.

As shown in FIGURE 8 the operator may also coat the interior sides of the silo with the material used to form the cover as 64, 66 and 68 of the silo 61 to form air-tight layer 162 and seals 163.

The apparatus 61 has particular utility in smaller operation where insufficient silage is produced or bought at one time to fill a conventional 20 or 10 foot diameter upright or tower silo as 61 at one time. In such smaller operations crops such as alfalfa and oats are harvested four to six times a year during the spring and summer months. At each cutting the silage as 63 goes into the tower silo as 61 and a wax seal cover as 64 is applied whereby the normal ensiling process can be maintained as the air is excluded. At the next cutting silage 65 is put in on top of the first cutting 63 and following this 67 on top of 66 until the silo is full at which time a top seal 68 may be applied thereby giving a complete seal.

This invention covers also cutting high moisture legumes as alfalfa hay at moisture content of 20 to 32% and at its highest nutrient value, compacting and ensiling it in capsules or chambers as above described; this eliminates leaf loss, keratin loss and nutrient efficiency loss due to loss in moisture content.

I claim:

1. A process of producing silage from forage crops comprising the steps of filling a silo with forage and compacting the forage, forming a water-insoluble, air and water-impermeable hydrocarbon wax cover sheet which is edible by ruminants and having a tensile strength of 80 to 500 p.s.i. on top of the forage by spraying said molten hydrocarbon wax upon said forage with sufficient force to drive said molten wax through orifices between the intermeshed forage components to form vertically elongated masses of wax with lateral extensions and locking said masses and said extensions with forge components adjacent thereto and thereby attaching the bottom surface of said cover sheet to the upper layers of said forage to exclude air from entering said forage and thereafter ensiling.

2. A process as in claim 1 wherein the hydrocarbon wax is a microcrystalline wax.

3. A process as in claim 2 wherein said microcrystalline wax has a melting point between 145° F. and 195° F.

4. A process as in claim 1 wherein said hydrocarbon wax is composed of a blend of up to 20 percent by weight polyethylene having a molecular weight of about 2,000 and a paraffin wax with a melting point of about 150° F.

5. A process of producing sliage from forage crops comprising the steps of filling a silo with forage and compacting the forage, forming a water-insoluble air and water-impermeable hydrocarbon wax cover sheet which is edible by ruminants and having a tensile strength of 80 to 500 p.s.i. on top of the forage by spraying said molten hydrocarbon wax upon said forage with sufficient force to drive said molten wax through orifices between the intermeshed forage components to form vertically elongated masses of wax with lateral extensions and locking said masses and said extensions with forage components adjacent thereto and thereby attaching the bottom surface of said cover sheet to the upper layers of said forage to exclude air from entering said forage and ensiling and thereafter removing portions of the resultant silage together with portions of said cover and feeding the mixture of said silage and cover to cattle.

6. Process as in claim 5 wherein the cover is composed of a flexible hydrocarbon wax having a tensile strength of 80 to 400 p.s.i.

7. A process as in claim 5 wherein the hydrocarbon wax is a microcrystalline wax.

8. A process as in claim 7 wherein said microcrystalline wax has a melting point between 145° F. and 195° F.

9. A process as in claim 5 wherein said hydrocarbon wax is composed of a blend of up to 20 percent by weight polyethylene having a molecular weight of about 2,000 and a paraffin wax with a melting point of about 150° F.

10. Process as in claim 1 wherein the cover is composed of a flexible hydrocarbon wax having a tensile strength of 80–400 p.s.i.

References Cited

UNITED STATES PATENTS

| | | | |
|---|---|---|---|
| 2,322,198 | 6/1943 | Parsons | 99—166 |
| 2,768,896 | 10/1956 | Lewis | 99—8 |
| 2,776,890 | 1/1957 | Kunz | 99—8 |
| 2,849,320 | 8/1958 | Weinmann et al. | 99—166 |
| 3,192,052 | 6/1965 | Cumming et al. | 99—166 |

OTHER REFERENCES

Journal of Dairy Science, vol. 39, p. 10, 1956.

A. LOUIS MONACELL, Primary Examiner

N. ROSKIN, Assistant Examiner